Patented Jan. 4, 1938

2,104,717

UNITED STATES PATENT OFFICE 2,104,717

PRODUCTION OF OLEFINE ETHERS

Henry C. Chitwood and Granville A. Perkins, Charleston, W. Va., assignors to Carbide and Carbon Chemicals Corporation, a corporation of New York No Drawing. Application January 7, 1936, Serial No. 57,886

7 Claims. (Cl. 260—151)

This invention relates to improvements in processes for making olefine ethers by treating beta-chlorinated ethers with a strong alkali in the presence of a strongly basic amine as a catalyst.

The process of this invention is preferably carried out with the initial reactants substantially in the liquid phase, and we prefer to use relatively nonvolatile amines as catalysts for promoting the reaction between the strong alkali and the beta-chlorinated ether. Throughout this specification and the appended claims the term "nonvolatile amine" will be taken to include those amines which do not appreciably volatilize below about 150° C. This invention, however, is not limited to the use of amine catalysts of this class, and more volatile amines may be used as catalysts as will more fully hereinafter appear.

A principal object of the invention is the provision of an improved process for making olefine ethers in a simple efficient and economical manner. A feature of this invention involves the promotion of the formation of unsaturated or olefine ethers from beta-chlorinated ethers by the action of a strong alkali through the agency of a strongly basic amine. Another feature involves the use of the initial reactants primarily in the liquid phase.

The amines which are suitable as catalysts for promoting this reaction may be chosen from the class of heterocyclic, alicyclic, aromatic, or aliphatic amines, and primary, secondary and tertiary amines or mixtures thereof may be used. In general it is unnecessary to use large amounts of the amine catalyst, and from about 5% to about 20% by weight, based on the amount of the chlorinated ether, is sufficient. In the practice of the process of this invention, it is unnecessary to employ a solvent for the alkali employed, and contact of the alkali with the beta-chlorinated ethers is conveniently effected by dispersing the solid alkali in finely divided form in the ether with which it is to react.

The invention will be adequately illustrated by the following examples:

Example I

A mixture of about 20 parts by weight of solid sodium hydroxide in finely divided form and about 100 parts by weight of bis-beta chloroethyl ether was agitated in an iron kettle for about 3 to 3½ hours at the boiling point of the mixture. To this boiling mixture was added about 4.5 parts by weight of triethanolamine and the reaction was continued. The triethanolamine added as a catalyst to promote the reaction consisted of a mixture which contained, in addition to the tertiary amine, small quantities of monoethanolamine and diethanolamine. After the addition of the amine catalyst and during the course of the reaction, the boiling point of the mixture decreased to about 150° C.

The reaction products were recovered in the form of a distillate which included chloroethyl vinyl ether, divinyl ether and unchanged bis-beta chloroethyl ether, together with small amounts of water. This distillate was removed continuously during the reaction through a fractionating column, the still head temperature of which was maintained at about 90° C. The yield of chloroethyl vinyl ether obtained was about 70% of the theoretical, based on the amount of sodium hydroxide employed.

In the reaction described, the bis-beta chloroethyl ether was present in considerable excess over the theoretical amount required to react with the sodium hydroxide, and this factor maintained a liquid condition in the reaction kettle at all times. The solid alkali and the sodium chloride formed in the reaction were maintained in a finely divided state dispersed throughout the liquid in this reaction.

After the reaction was completed, water was added in substantial quantity to dissolve the salt, and further quantities of unreacted bis-beta chloroethyl ether were readily separated from the salt solution by decantation.

Example II

Divinyl ether may be conveniently made from the chloroethyl vinyl ether obtained as described in Example I, and it is preferably obtained from a mixture of this ether with bis-beta chloroethyl ether. A mixture of about 50 parts by weight each of the two ethers (which may be replaced, if desired, by about 100 parts by weight of bis-beta chloroethyl ether alone), was stirred with about 20 parts by weight of flaked sodium hydroxide for about 3 hours at the boiling point of the mixture. To this boiling mixture was added about 5 parts by weight of triethanolamine, and the reaction was continued with agitation.

The reaction products were removed, as in the previous example, as a distillate which included chloroethyl vinyl ether, small amounts of water, and divinyl ether equivalent to a yield of about 70% of the theoretical. The still head of the fractionating column through which this distillate was removed, was maintained at from about 50° to about 70° C. The quantity of chloroethyl vinyl ether removed in the operation of this process was approximately equal to the quantity originally introduced in the starting mixture. This can be reused, making the process substantially cyclical, or it may be purified and employed as such. If more pure divinyl ether is desired, this process may be varied by removing water through a decanter from about the middle of a fractionating column. This variation permits a lower still head temperature to be maintained, and the distillate will contain a more pure divinyl ether.

The process of this invention may be operated similarly to produce other olefine ethers. For example, chloroisopropyl isopropenyl ether and diisopropenyl ether can be easily prepared from liquid bis-beta dichloroisopropyl ether. By the process described in the examples above, it is likewise easy to produce vinyl isopropenyl ether from beta chloroethyl beta chloroisopropyl ether. Mixed ethers, such as vinyl ethyl ether and vinyl butyl ether, can be readily obtained from beta chloroethyl ethyl ether and beta chloroethyl butyl ether, respectively.

Of the strongly basic, relatively nonvolatile amines which are particularly efficacious in promoting the reaction described above, the hydroxyalkyl amines were found to be the most effective. Of these, the ethanolamines produced very efficient and highly desirable results. Triethanolamine was found to be particularly effective, and is preferred as a catalyst. Diethanolamine and monoethanolamine can also be used, and both are effective whether used in the pure state or in admixture with each other or with triethanolamine. Examples of other active catalysts are piperidine, diamylamine, pyridine, aniline and dimethyl aniline.

The presence of all the reactants, except the alkali, in the liquid phase appears to be of critical importance. By the operation of this process, relatively low temperatures are sufficient, and the yields obtained are in every case good. The ease of operation and the effectiveness of this process will make its value apparent.

The process described above is susceptible of modification and such modifications are included within the invention as defined by the appended claims.

We claim:

1. Process for the production of olefine ethers which comprises treating a beta-chlorinated aliphatic ether with a strong alkali in the presence of a catalyst essentially composed of a strongly basic amine which is not volatile below about 150° C.

2. Process for the production of olefine ethers which comprises treating a beta-chlorinated aliphatic ether with a strong alkali in the presence of a catalyst essentially composed of a hydroxyalkylamine.

3. Process for the production of olefine ethers which comprises treating a beta-chlorinated aliphatic ether with a strong alkali in the presence of an ethanolamine.

4. Process for the production of olefine ethers which comprises treating a beta-chlorinated aliphatic ether with a strong alkali in the presence of from about 5% to about 20% of a catalyst selected from the group consisting of triethanolamine, diethanolamine, monoethanolamine, and mixtures thereof.

5. Process for the production of olefine ethers which comprises treating a beta-chlorinated aliphatic ether in the liquid phase with a strong alkali in the presence of a catalyst essentially composed of a strongly basic amine such as a hydroxyalkylamine.

6. Process for the production of olefine ethers which comprises treating a beta-chlorinated aliphatic ether in the liquid phase with a finely divided strong alkali in the presence of a catalyst essentially composed of a strongly basic amine such as a hydroxyalkylamine.

7. Process for making vinyl ethers which comprises heating bis-beta chloroethyl ether in the liquid phase with sodium hydroxide in the presence of from about 5% to about 20% of an ethanolamine.

HENRY C. CHITWOOD.
GRANVILLE A. PERKINS.